United States Patent [19]

Schnell

[11] Patent Number: 5,434,359

[45] Date of Patent: Jul. 18, 1995

[54] ELECTRICAL BOX

[75] Inventor: Kenneth R. Schnell, South Bend, Ind.

[73] Assignee: Hubbell Incorporated, Orange, Conn.

[21] Appl. No.: 124,198

[22] Filed: Sep. 20, 1993

[51] Int. Cl.6 .............................................. H02G 3/08
[52] U.S. Cl. ........................................ 174/58; 220/3.6; 248/27.1
[58] Field of Search .............................. 174/48, 53, 58; 220/3.6, 3.92, 3.94; 248/27.1

[56] References Cited

U.S. PATENT DOCUMENTS

| 948,438 | 2/1910 | Ziegler et al. | |
|---|---|---|---|
| 1,296,071 | 3/1919 | Gelatt | 248/27.1 |
| 1,393,794 | 10/1921 | Kuhlman | 220/3.6 |
| 1,818,317 | 8/1931 | Gilmore | 220/3.6 |
| 2,242,290 | 5/1941 | Dember | 220/3.2 |
| 2,315,746 | 4/1943 | Stewart | 220/3.6 |
| 2,320,400 | 6/1943 | Bedell | 220/3.6 |
| 2,357,787 | 9/1944 | Windsheimer | 220/3.6 |
| 2,401,948 | 6/1946 | Loy | 174/53 |
| 2,451,267 | 10/1948 | Wilder | 174/48 |
| 2,491,742 | 12/1949 | Lein | 248/27.1 |
| 2,730,261 | 1/1956 | Tutt | 220/3.7 |
| 2,966,325 | 12/1960 | Pascucci | 248/343 |
| 2,992,754 | 7/1961 | Grimes | 220/447 |
| 3,052,369 | 9/1962 | Taibi | 220/3.6 |
| 3,090,587 | 5/1963 | Peterson | 248/27.1 |
| 3,392,943 | 7/1968 | Baxter | 248/27.1 |
| 3,468,448 | 9/1969 | McHollan et al. | 220/3.6 |
| 3,701,451 | 10/1972 | Schindler et al. | 220/27 |
| 3,848,764 | 11/1974 | Salg | 220/3.6 |
| 3,963,204 | 6/1976 | Liss | 248/27 |
| 3,966,152 | 6/1976 | Bromberg | 248/27 |
| 4,000,874 | 1/1977 | Finley et al. | 248/27.1 |
| 4,297,525 | 10/1981 | Bowden, Jr. | 174/58 |
| 4,580,689 | 4/1986 | Slater | 220/3.2 |
| 4,605,816 | 8/1986 | Jorgensen et al. | 174/65 R |
| 4,666,055 | 5/1987 | Lewis | 220/3.2 |
| 4,874,905 | 10/1989 | Schnell et al. | 174/65 |

FOREIGN PATENT DOCUMENTS 2333988  7/1977  France .

Primary Examiner—Leo P. Picard
Assistant Examiner—David Tone
Attorney, Agent, or Firm—Jerry M. Presson; David L. Tarnoff

[57] ABSTRACT

A nonmetallic electrical box which has mounting surfaces or contacting points, a pair of bosses and a pair of securing arms. The bosses extend from the center of the top and bottom walls of the box for mounting a wiring device within the box, and the securing arms extend from the top and bottom walls for securing the box within the opening of a wall or ceiling. The contacting points are spaced apart along the top and bottom walls, are coplanar and extend outwardly from the top and bottom walls a distance at least equal to the distance the bosses and arms extend outwardly from the top and bottom walls, thereby preventing any side to side rocking motion when the box is mounted within a rectangular opening.

22 Claims, 3 Drawing Sheets

ELECTRICAL BOX

FIELD OF THE INVENTION

This invention relates to an electrical nonmetallic box which can be securely mounted within a rectangular wall or ceiling opening. More particularly, this invention relates to an electrical box having arms for engaging the interior of the wall, flanges for engaging the exterior of the wall and coplanar contacting surfaces for engaging the top and bottom sides of the opening, thereby securing the box and preventing any side to side rocking motion within the opening.

BACKGROUND OF THE INVENTION

To conveniently support an electrical wiring device, such as a switch or receptacle, an electrical lighting fixture, or simply a covered plate, an electrical box is mounted in an opening formed in a wall or ceiling and the electrical wiring device is fastened to the box by mounting screws. Conventional electrical boxes are stamped from metal, but more recently these boxes are made from nonmetallic materials, such as thermoplastic compositions. These more recent electrical boxes are secured within the opening via two pivotal arms wherein one arm is mounted on a corner of each of the top and bottom end walls of the box diagonally opposite from one another. The electrical wiring device is secured to the box by threading screws within bosses formed integrally with the box and which extend from the center of the top and bottom end wall edges of the box.

However, these pivotal arms and bosses present several problems when positioning the electrical box within the opening of a wall or ceiling. For example, due to the placement of the arms and bosses, i.e., at one corner and in the center of the top and bottom walls, the box rocks from side to side if it is placed within a rectangular opening. In order to eliminate this rocking action, an irregularly shaped opening must be cut in the mounting surface, which is difficult and time consuming.

Examples of prior electrical boxes are disclosed in the following U.S. Pat. Nos. 2,491,742 to Lein; 3,392,943 to Baxter; 3,848,764 to Salg; 3,963,204 to Liss; 4,580,689 to Slater; 4,605,816 to Jorgensen et al; 4,666,055 to Lewis; and 4,874,905 to Schnell et al.

Thus, a need in the electrical art exists to provide an improved electrical box which can be easily mounted in a rectangular opening of a wall or ceiling. This invention addresses this need in the art, along with other needs which will become apparent to those skilled in the art once given this disclosure.

SUMMARY OF THE INVENTION

Accordingly, a primary object of the invention is to provide an electrical box which can be securely positioned within a rectangular opening of a wall or ceiling.

Another object of the invention is to provide an electrical box which is fast and easy to install.

A further object of the invention is to provide an electrical box which is easy and inexpensive to manufacture and has very few parts associated therewith.

The foregoing objects are basically attained by providing an electrical box for mounting within a rectangular opening of a mounting wall, comprising: first and second side walls, each of the side walls having a first end and a second end spaced apart from one another; a first end wall extending between one of the ends of the side walls and having a first positioning member for engaging the opening of the mounting wall with first and second contacting points extending outwardly from the first end wall and arranged substantially parallel to the first end wall, and a first mounting flange for engaging the exterior surface of the mounting wall upon inserting the box into the opening, extending outwardly from the first end wall a greater distance than the first and second contacting points, the contacting points being coplanar and spaced apart for engaging the mounting wall upon mounting the box within the opening, one of the first and second contacting points of the first positioning member being adjacent one of the first and second side walls, the other of the first and second contacting points being adjacent the other of the first and second side walls; a second end wall extending between the other of the ends of the side walls and having a second mounting flange extending outwardly from the second end wall for engaging an exterior surface of the mounting wall upon inserting the box into the opening; a rear wall extending between the side walls and the end walls; a first securing member for securing the box within the opening, the first securing member being movably mounted to the first end wall between a first retracted position in which the first securing member extends outwardly from the first end wall a distance no greater than the distance the first and second contacting points extend outwardly from the first end wall and a second extended position in which the first securing member engages an interior surface of the mounting wall upon inserting the box into the opening and extends outwardly a distance greater than the distance the first and second contacting points extend outwardly from the first end wall; and a second securing member for securing the box within the opening mounted to and extending outwardly from the second end wall and engaging the interior surface of the mounting wall upon inserting the box into the opening.

The foregoing objects may also be attained by providing an electrical box for mounting within a rectangular opening of a mounting wall, comprising: first and second side walls, each of the side walls having a first end and a second end spaced apart from one another; a first end wall extending between one of the ends of the side walls and having a first positioning member for engaging the opening of the mounting wall with a first and a second contacting point extending outwardly from and arranged substantially parallel to the first end wall for engaging the mounting wall upon mounting the box within the opening and a first mounting flange extending outwardly from the first end wall a greater distance than the first and the second contacting points for engaging the exterior side of the mounting wall when the box is inserted into the opening, the contacting points being coplanar, one of the first and second contacting points being immediately adjacent one of the first and second side edges and the other of the first and second contacting points being spaced at least 50% of the distance between the side walls from the other of the first and second contacting points; a second end wall extending between the other of the ends of the side walls and having a second mounting flange extending outwardly from the second end wall for engaging an exterior surface of the mounting wall upon inserting the box into the opening; a rear wall extending between the side walls and the end walls; a first securing member for securing the box within the opening, the first securing member being movably mounted to the first end wall between a first retracted position in which the first securing member extends outwardly from the first end wall a distance no greater than the distance the contacting points extend outwardly from the first end wall and a second extended position in which the first securing member engages an interior surface of the mounting wall upon inserting the box into the opening and extends outwardly a distance greater than the distance the first and second contacting points extend outwardly from the first end wall; and a second securing member for securing the box within the opening mounted to and extending outwardly from the second end wall and engaging the interior surface of the mounting wall upon inserting the box into the opening.

Finally, the foregoing objects may be attained by providing an electrical box for mounting within a rectangular opening of a mounting wall, comprising: first and second side walls, each of the side walls having a first end and a second end being spaced apart from one another; a first end wall extending between one of the ends of the side walls and having a first mounting surface for positioning the box within the opening including a first and second contacting point and a first flange extending outwardly from the first end wall a greater distance than the first mounting surface for engaging the exterior side of the mounting wall upon inserting the box into the opening, the contacting points extending outwardly from and arranged substantially parallel to the first end wall between the side walls and having a length at least equal to half the width of the first end wall, one of the first and second contacting points being adjacent each of the ends of the first mounting surface and engaging the mounting wall upon mounting the box within the opening; a second end wall extending between the other of the ends of the walls and having and a second flange extending outwardly from the second end wall for engaging an exterior surface of the mounting wall upon inserting the box into the opening; a rear wall extending between the side walls and the end walls; a first securing member for securing the box within the opening, the first securing member being movably mounted to the first end wall between a first retracted position in which the first securing means extends outwardly from the first end wall a distance no greater than the distance the first mounting surface extends outwardly from the first end wall and a second extended position in which the first securing means engages an interior surface of the mounting wall upon inserting the box into the opening and extends outwardly a distance greater than the distance the first mounting surface extends outwardly from the first end wall; and a second securing member for securing the box within the opening mounted to and extending outwardly from the second end wall and engaging the interior surface of the mounting wall upon inserting the box into the opening.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring now to the drawings which form part of this original disclosure.

DETAILED DESCRIPTION OF THE INVENTION

Figure 1:
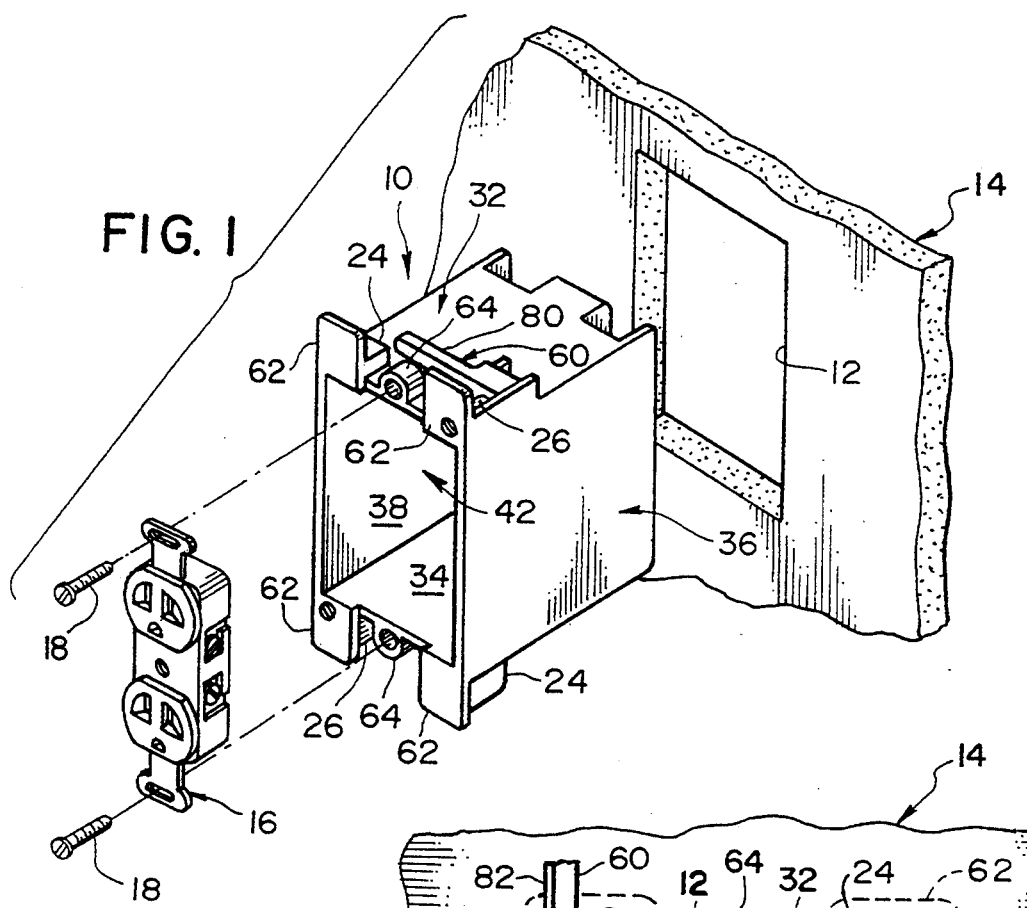
FIG. 1 is an exploded, perspective view of an electrical box in accordance with the present invention before being mounted within an opening formed in a wall and before having an electrical receptacle mounted thereto.
Figure 2:
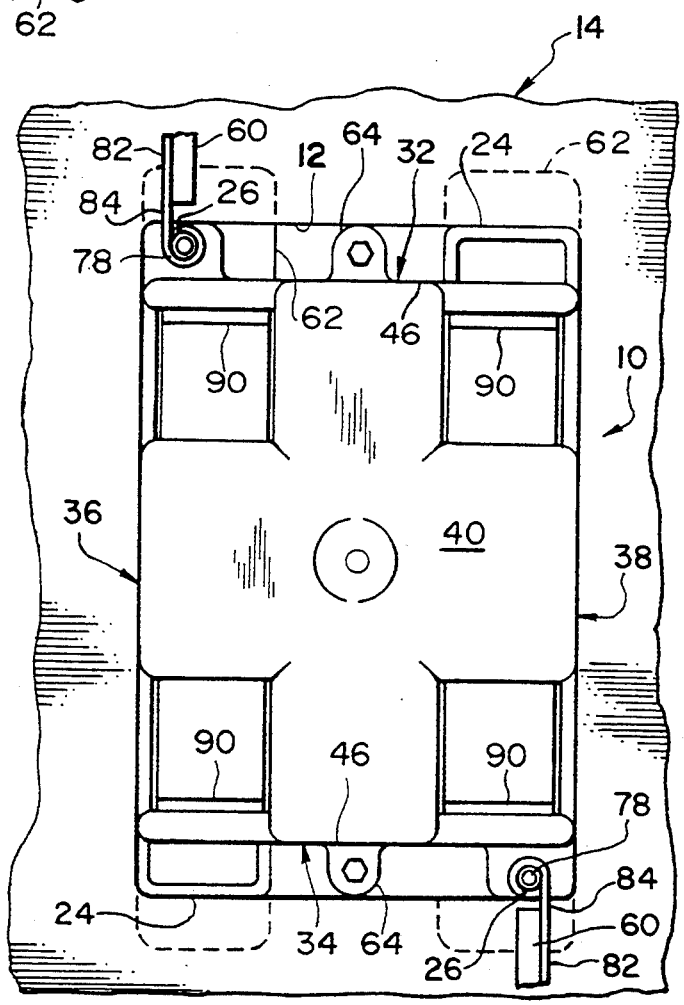
FIG. 2 is a rear elevational view of the electrical box of FIG. 1 after being mounted within the opening in a wall.

As seen in FIGS. 1 and 2, the electrical box 10 is illustrated in accordance with the present invention, which is mounted within a rectangular opening 12 formed in a mounting surface or wall 14. A wiring device 16, such as an outlet receptacle or switch, can be mounted within electrical box 10 via mounting screws 18 in a conventional manner.

As seen in FIGS. 1-5, electrical box 10 has a pair of contacting or mounting surfaces 24 and 26 integrally formed at each end for positioning electrical box 10 within opening 12 to prevent electrical box 10 from rocking from side to side. Contacting surfaces 24 and 26 form at least two spaced apart contact points. It will become apparent to one skilled in the art upon reviewing this disclosure that contacting surfaces 24 and 26 can be modified in a variety of ways for engaging the opening 12, such as a single surface having at least two contacting points or two surfaces both of which act as contacting points. Thus, electrical box 10 can be installed into an easy-to-cut rectangular opening 12 quickly and efficiently.

Electrical box 10 is preferably formed as a one-piece, unitary, integrally molded member from a suitable nonmetallic material, such as a rigid thermoplastic or thermoset composition. An example of such a thermoplastic material is polyvinylchloride, and an example of such a thermoset material is phenolic resin.

Electrical box 10 is substantially rectangular in front elevational view and includes top and bottom end walls 32 and 34, respectively, a pair of side walls 36 and 38 coupled to end walls 32 and 34, a rear wall 40 coupled to end walls 32 and 34 and side walls 36 and 38 and an open front 42. Top and bottom end walls 32 and 34 are substantially parallel to one another and spaced apart. Side walls 36 and 38 are also substantially parallel to one another and spaced apart. Top end wall 32 extends substantially perpendicularly between the upper ends of side walls 36 and 38. Similarly, bottom end wall 34 extends substantially perpendicularly between the lower ends of side walls 36 and 38. Rear wall 40 is substantially perpendicular to end walls 32 and 34 and side walls 36 and 38 and extends between each of them. Open front 42 allows wiring device 16 to be mounted within electrical box 10.

Figure 5:
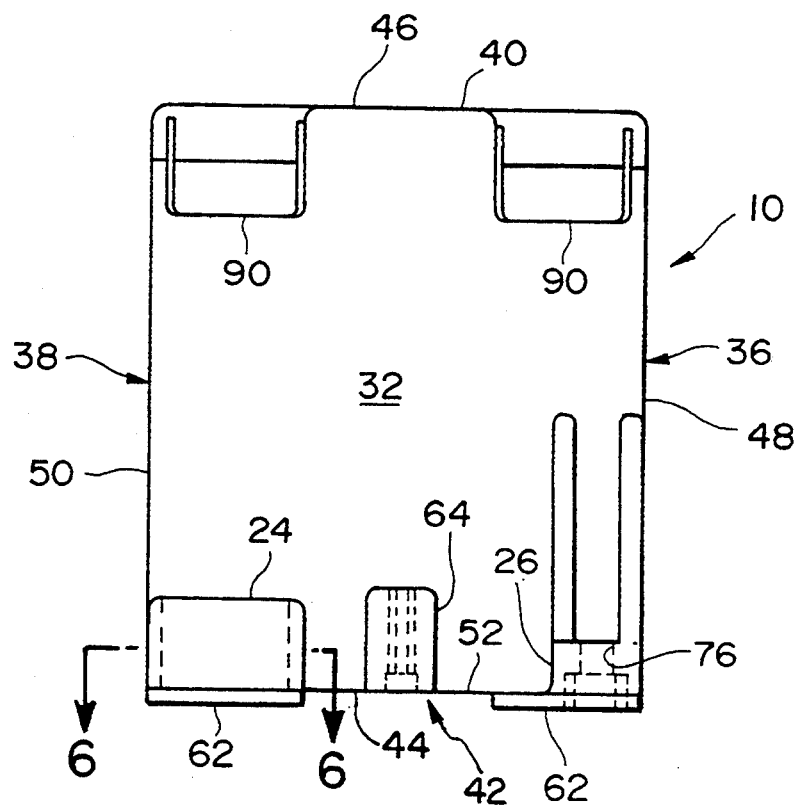
FIG. 5 is a top plan view of the electrical box of FIGS. 1-4 with the mounting arms partially broken away for clarity.

Top and bottom end walls 32 and 34 are substantially identical. Accordingly, only top end wall 32 will be discussed and illustrated in detail. As seen in FIG. 5, top end wall 32 includes front and back edges 44 and 46, respectively, and a pair of side edges 48 and 50. These edges 44–50 intersect to form the four corners of the top end wall 32. Also, each of the top and bottom end walls 32 and 34 include contacting surfaces 24 and 26, a pivotal securing arm 60, a pair of mounting flanges 62 and a screw receiving boss 64 as seen in FIGS. 1–3.

Contacting surfaces 24 and 26 act to position electrical box 10 within opening 12 and prevent box 10 from rocking side to side within opening 12. At least two contacting surfaces 24 and 26 must extend coplanarly from either of the end walls 32 and 34 to prevent the rocking motion. However, contacting surfaces 24 and 26 can be part of a single mounting surface extending along each of the top and bottom end walls 32 and 34. Preferably, the two contacting surfaces 24 and 26 extend coplanarly from both of the end walls 32 and 34 as shown in FIGS. 2 and 3 with both top and bottom end walls 32 and 34 having a pair of spaced contacting surfaces 24 and 26. Furthermore, contacting surfaces 24 and 26 extend upwardly, outwardly and perpendicularly to their respective end wall 32 and 34 along the respective end wall's front edge 44.

Figure 3:
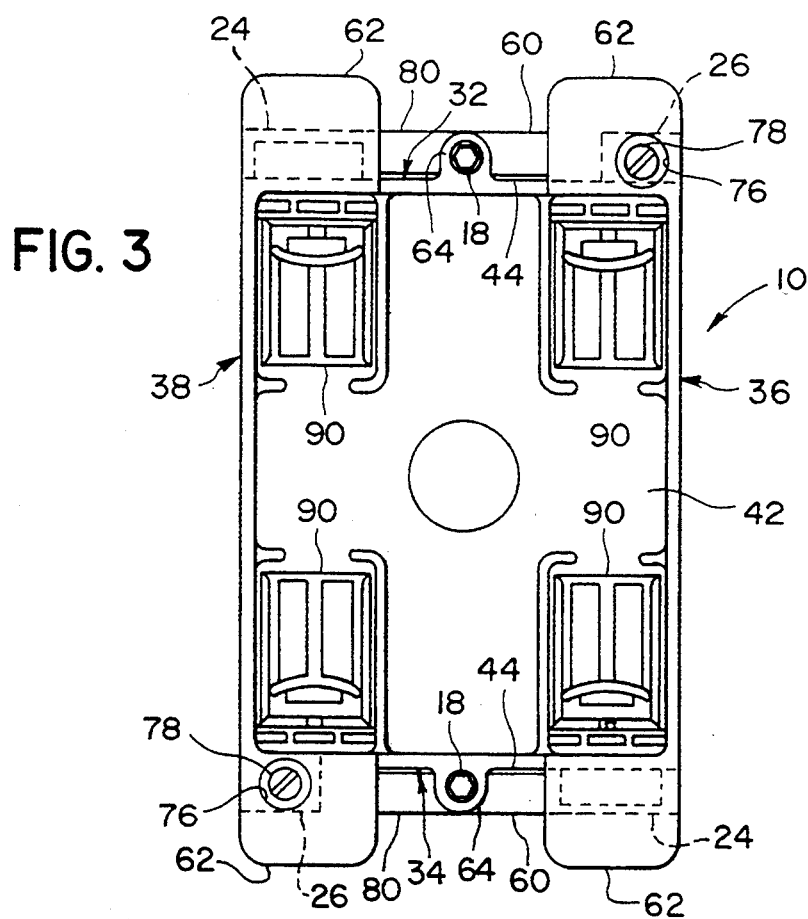
FIG. 3 is a front elevational view of the electrical box of FIGS. 1 and 2.
Figure 4:
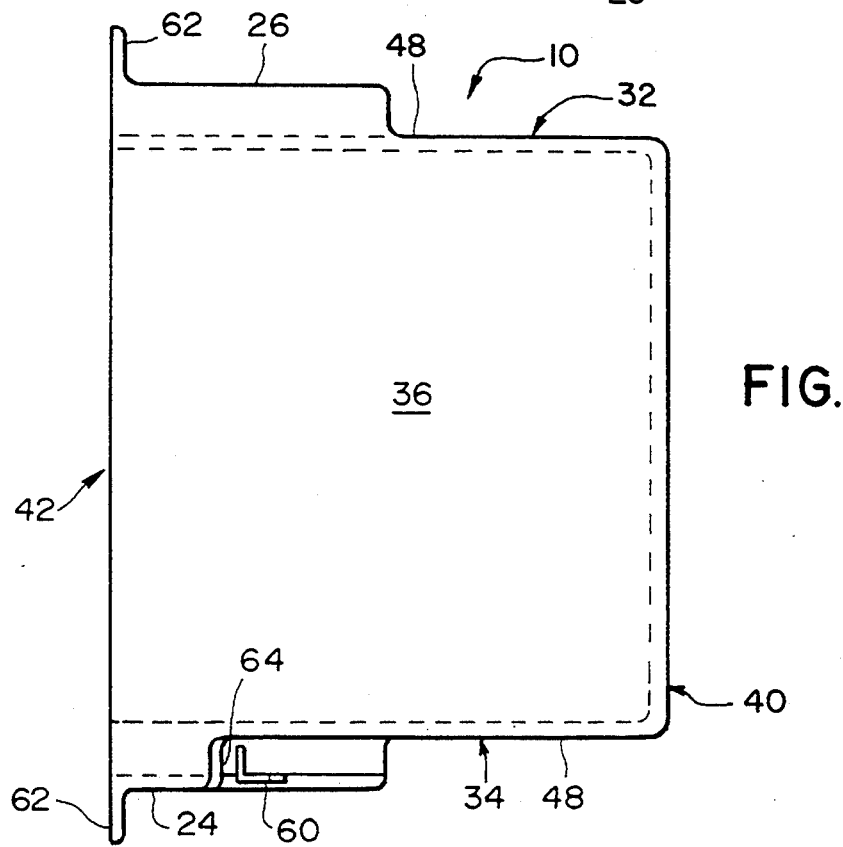
FIG. 4 is a right side elevational view of the electrical box of FIGS. 1-3.

As seen in FIGS. 1–3, contacting surfaces 24 are diagonally opposite and identical with one of contacting surfaces 24 extending from top end wall 32 and the other of contacting surfaces 24 extending from bottom end wall 34. Contacting surfaces 26 are also diagonally opposite and identical with one of contacting surfaces 26 extending from top end wall 32 and one of contacting surfaces 26 extending from bottom end wall 34.

In the preferred embodiment, contacting surfaces 24 and 26 are spaced apart and positioned immediately adjacent the corners where side edges 48 and 50 meet front edge 44. Preferably, they may be spaced apart by a distance equal to at least 50% of the distance between side edges 48 and 50 of end walls 32 and 34, or they may be adjacent the ends of a continuous mounting surface extending a length equal to at least 50% of the distance between side edges 48 and 50.

Figure 6:
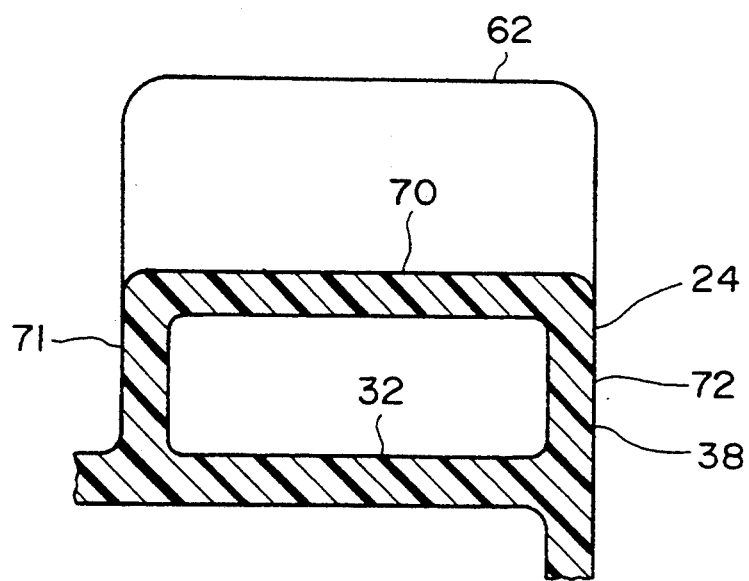
FIG. 6 is an enlarged, partial cross-sectional view of a contacting point or mounting surface of the electrical box taken along line 6—6 of FIG. 5.

As seen in FIG. 6, contacting surfaces 24 are preferably hollow and have three faces 70–72. Top face 70 is parallel to top end wall 32 and extends perpendicularly between side faces 71 and 72 which are spaced apart and parallel to one another and extend from top face 70 to top end wall 32. This hollow construction helps to keep electrical box 10 lightweight and inexpensive to manufacture since less material is used. Each of the contacting surfaces 26 has a hole 76 extending therethrough, as seen in FIGS. 3 and 5.

Preferably, both top and bottom end walls 32 and 34 have a securing arm 60 pivotally coupled thereto. However, only one arm 60 may be mounted on either of end walls 32 and 34. As seen in FIGS. 1–4, securing arms 60 are pivotally coupled at diagonally opposite corners of their respective end walls 32 and 34 adjacent front edge 44 and contacting surfaces 26.

As seen in FIG. 2, arms 60 are pivotally mounted to end walls 32 and 34 via screws 78, which are threadedly received within holes 76. Arms 60 pivot between two positions. As seen in FIGS. 1 and 3, arms 60 are in their retracted position and in FIG. 2, arms 60 are in their extended position.

In their retracted position, arms 60 extend substantially parallel to end walls 32 and 34 and extend outwardly from end walls 32 and 34 a distance no greater than contacting surfaces 24 and 26 so that electrical box 10 can be easily inserted into opening 12 of mounting surface 14. In the extended position, arms 60 are substantially perpendicular to end walls 32 and 34 and extend outwardly from end walls 32 and 34 a distance greater than contacting surfaces 24 and 26 for securing electrical box 10 within opening 12 of mounting surface 14.

Stop surface 84 limits the pivotal movement of arms 60 to 90° between their retracted position and extended position. Arms 60 can be formed of either metal or plastic depending upon the desired strength required or many other factors.

Flanges 62 extend outwardly from end walls 32 and 34 a distance greater than contacting surfaces 24 and 26, and are spaced apart and substantially rectangular. Preferably, as seen in FIGS. 1, 3, 4 and 6, two flanges 62 extend from top end wall 32, and two flanges 62 extend from bottom end wall 34. Flanges 62 are positioned at the corners of top and bottom end walls 32 and 34 adjacent open end 42. Flanges 62 are aligned with contacting surfaces 24 and 26, and have a substantial thickness to prevent them from breaking when box 10 is mounted within opening 12. Alternatively, it is possible to use only one flange 62 extending from each end wall 32 and 34.

Bosses 64 receive mounting screws 18 for coupling wiring device 16 within box 10. Bosses 64 will only be discussed generally because U.S. Pat. Nos. 4,580,689 to Slater and 4,666,055 to Lewis discuss them in detail, which are hereby incorporated herein by reference. As seen in FIGS. 1–4, bosses 64 extend perpendicularly upwardly and outwardly from the center of end walls 32 and 34 adjacent open end 42 and may act as additional contacting surfaces. Furthermore, bosses 64 extend outwardly from end walls 32 and 34 no further than contacting surfaces 24 and 26, and may be coplanar and spaced apart from contacting surfaces 24 and 26.

Rear wall 40 includes cable clamps 90 which receive electrical wires (not shown) therethrough and clamp the wires within electrical box 10. Such clamps 90 are described in detail in U.S. Pat. No. 4,605,816 to Jorgensen et al which is hereby incorporated herein by reference. Thus, clamps 90 will not be discussed in further detail.

ASSEMBLY AND OPERATION

Electrical box 10 is inserted and positioned within opening 12 of mounting surface 14 with pivotal arms 60 in their retracted positions. With box 10 inserted within opening 12, flanges 62 of electrical box 10 engage the exterior surface of wall 14 to prevent electrical box 10 from falling completely through opening 12. Arms 60 are then pivoted from their retracted position to their extended position for engaging the interior surface of opening 12. Specifically, a screw driver or other tool is used to rotate screws 78 which in turn pivots arms 60 from their retracted position lying substantially parallel to end walls 32 and 34 to their extended position lying substantially perpendicular to end walls 32 and 34. Further pivotal movement of arms 60 past their retracted position is prevented since arms 60 engage stop surfaces 84. Screws 78 are further rotated causing arms 60 to move axially along screws 78 until arms 60 abut against the interior surface of mounting surface 14. Accordingly, flanges 62 and arms 60 cooperate together to prevent electrical box 10 from being pulled or pushed out of opening 12. Now wiring device 16 is mounted within electrical box 10 via mounting screws 18.

Since contacting surfaces 24 and 26 along each of the end walls 32 and 34 are coplanar, they each engage the opening 12 of wall 14 along the top and bottom of opening and thereby prevent the rocking of electrical box 10 from side to side within opening 12. Thus, contacting surfaces 24 and 26 allow easy installation of electrical box 10 because a rectangular opening 12 can be to cut rather than an irregularly shaped opening which was previously necessary to stabilize box 10 therein.

While only the preferred embodiment of the present invention has been chosen to illustrate the invention, it will be understood by those skilled in the art that various changes and modifications can be made herein without departing from the scope of the invention as defined in the appended claims.

What is claimed is:

1. An electrical box for mounting within a rectangular opening of a mounting surface, comprising:

a first side wall and a second side wall, each of said side walls having a first end edge and a second end edge spaced apart from one another, and a front edge and a back edge spaced apart from one another;

a first end wall and a second end wall, each of said end walls extending between said side walls, each of said end walls having a first side edge coupled to said first side wall, a second side edge coupled to said second side wall and a front side edge with a first flat inner surface adjacent said first front edge, first and second coplanar and spaced apart contacting points extending outwardly from each of said first and second end walls and extending rearwardly from each of said front edges of said end walls, said first and second contacting points of each of said end walls being arranged substantially parallel to said first and second end walls for engaging the opening of the mounting surface upon mounting the box within the opening, a first mounting flange coupled to said first end wall and a second mounting flange coupled to said second end wall, said first and second mounting flanges extending outwardly a distance greater than said contacting points of their respective said end walls for engaging an exterior surface of the mounting surface upon inserting the box into the opening, one of said first and second contacting points of each of said end walls being adjacent one of said first and second side walls, the other of said first and second contacting points of each of said end walls being adjacent the other of said first and second side walls, each of said first and second contacting points of each of said end walls extending along said first front edge from its respective side wall a distance less than 50% of the distance between said side walls and extending rearwardly a distance less than 50% of the length of said first and second end walls;

a rear wall extending between said side walls and said end walls;

first securing means for securing the box within the opening, said first securing means extending outwardly from said first end wall and being movably mounted to said first end wall between a first retracted position in which said first securing means extends outwardly from said first end wall a distance no greater than the distance said first and second contacting points of said first end wall extend outwardly from said first end wall and a second extended position in which said first securing means engages an interior surface of the mounting surface upon inserting the box into the opening and extends outwardly a distance greater than the distance said first and second contacting points of said first end wall extend outwardly from said first end wall; and second securing means for securing the box within the opening mounted to and extending outwardly from said second end wall and engaging the interior surface of the mounting surface upon inserting the box into the opening.

2. An electrical box as claimed in claim 1, wherein said second end wall includes third and fourth coplanar and spaced apart contacting points extending outwardly from said second end wall and rearwardly from said second front edge and arranged substantially parallel to said second end wall for engaging the opening of the mounting surface upon mounting the box within the opening, one of said third and fourth contacting points being immediately adjacent one of said first and second side walls, the other of said third and fourth contacting points being immediately adjacent the other of said first and second side walls, each of said second and third contacting points extending along said second front edge from its respective side wall a distance less than 50% of the width of said second end wall and extending rearwardly a distance less than half the length of said second end wall, and said second flange extending outwardly from said second end wall a greater distance than said third and fourth contacting points.

3. An electrical box as claimed in claim 2, wherein said second securing means extends outwardly from and is movably mounted to said second end wall and has a first retracted position in which said second securing means extends outwardly a distance no greater than the distance said third and fourth contacting points extend outwardly from said second end wall and a second extended position in which said second securing means extends outwardly a greater distance than said third and fourth contacting points for engaging the interior surface of the mounting surface upon inserting the box into the opening.

4. An electrical box as claimed in claim 3, wherein said first end wall includes a third mounting flange extending outwardly from said first end wall a greater distance than said first and second contacting points for engaging the exterior surface of the mounting wall upon inserting the box into the opening.

5. An electrical box as claimed in claim 4, wherein said second end wall includes a fourth mounting flange extending outwardly from said second end wall a greater distance then said third and fourth contacting points for engaging the exterior surface of the mounting wall upon inserting the box into the opening.

6. An electrical box as claimed in claim 5, wherein one of said first and third flanges is adjacent one of said first and second side walls of said first end wall and the other of said first and second flanges is adjacent the other of said first and second side walls of said first end wall, and one of said second and fourth flanges is adjacent one of said first and second side walls of said second end wall and the other of second and fourth flanges is adjacent the other of said first and second side walls of said second end wall.

7. An electrical box as claimed in claim 6, wherein said first securing arm is adjacent one of said first and second side walls of said first end wall, and said second securing arm is adjacent the other one of said first and second side walls of said second end wall such that said first and second securing arms are diagonally opposite one another.

8. An electrical box as claimed in claim 7, wherein each of said side walls, end walls and rear wall are formed of plastic.

9. An electrical box as claimed in claim 3, wherein each of said first and second securing means includes a securing arm pivotally coupled to its associated said end wall by a screw, and a stop surface for limiting the pivotal movement of said arm between said first retracted position with said arm extending substantially parallel to its associated said end wall and said second extended position with said arm extending substantially perpendicular to its associated said end wall.

10. An electrical box for mounting within a rectangular opening of a mounting surface, comprising:

first and second side walls, each of said side walls having a first end and a second end spaced apart from one another;

a first end wall extending between one of said ends of said side walls and having a first front edge, a first flat inner surface adjacent said first front edge, a first and a second coplanar and spaced apart contacting point extending outwardly from said first end wall and rearwardly from said front edge and arranged substantially parallel to said first end wall for engaging the opening of the mounting surface upon mounting the box within the opening and a first mounting flange extending outwardly from said first end wall a greater distance than said first and second contacting points for engaging the exterior side of the mounting surface when the box is inserted into the opening, one of said first and second contacting points being immediately adjacent one of said first and second side walls and extending less than 50% of the distance between said side walls along said first front edge and the other of said first and second contacting points being spaced at least 50% of the distance between said side walls from the other of said first and second contacting points;

a second end wall extending between the other of said ends of said side walls and having a second front edge, a second inner surface being smooth and flat adjacent said second front edge, a second mounting flange extending outwardly from said second end wall for engaging an exterior surface of the mounting surface upon inserting the box into the opening;

a rear wall extending between said side walls and said end walls;

first securing means for securing the box within the opening, said first securing means extending outwardly from and being movably mounted to said first end wall between a first retracted position in which said first securing means extends outwardly from said first end wall a distance no greater than the distance said contacting points extend outwardly from said first end wall and a second extended position in which said first securing means engages an interior surface of the mounting surface upon inserting the box into the opening and extends outwardly a distance greater than the distance said first and second contacting points extend outwardly from said first end wall; and second securing means for securing the box within the opening mounted to and extending outwardly from said second end wall and engaging the interior surface of the mounting surface upon inserting the box into the opening, said first ends of said first and second side walls and said first and second edges of said first and second end walls forming a rectangular opening.

11. An electrical box as claimed in claim 10, wherein said second end wall includes third and fourth coplanar and spaced apart contacting points extending outwardly from said second end wall and rearwardly from said second front edge and arranged substantially parallel to said second end wall to engage the opening of the mounting surface upon mounting the box within the opening, one of said third and fourth contacting points being immediately adjacent one of said first and second side walls and extending less than 50% of the distance between said side walls along said first front edge and the other of said third and fourth contacting points being spaced at least 50% of the distance between said side walls from the other of said third and fourth contacting points and said second flange extends outwardly from said second end wall a greater distance than said third and fourth contacting points.

12. An electrical box as claimed in claim 11, wherein said second securing means extends outwardly from and is movably mounted to said second end wall and has a first retracted position in which said second securing means extends outwardly a distance no greater than the distance said third and fourth contacting points extend outwardly from said second end wall and a second extended position in which said second securing means extends outwardly a greater distance than said third and fourth contacting points for engaging the interior surface of the mounting surface upon inserting the box into the opening.

13. An electrical box as claimed in claim 12, wherein each of said first and second securing means includes a securing arm pivotally coupled to its associated said end wall by a screw, and a stop surface for limiting the pivotal movement of said arm between said first retracted position with said arm extending substantially parallel to its associated said end wall and said second extended position with said arm extending substantially perpendicular to its associated said end wall.

14. An electrical box as claimed in claim 11, wherein said first end wall includes a third mounting flange extending outwardly from said first end wall a greater distance than said first and second contacting points for engaging the exterior surface of the mounting wall upon inserting the box into the opening.

15. An electrical box as claimed in claim 14, wherein said second end wall includes a fourth mounting flange extending outwardly from said second end wall a greater distance then said third and fourth contacting points for engaging the exterior surface of the mounting wall upon inserting the box into the opening.

16. An electrical box as claimed in claim 15, wherein one of said first and third flanges is adjacent one of said first and second side walls of said first end wall and the other of said first and second flanges is adjacent the other of said first and second side walls of said first end wall, and one of said second and fourth flanges is adjacent one of said first and second side walls of said second end wall and the other of second and fourth flanges is adjacent the other of said first and second side walls of said second end wall.

17. An electrical box as claimed in claim 16, wherein said first securing arm is adjacent one of said first and second side walls of said first end wall, and said second securing arm is adjacent the other one of said first and second side walls of said second end wall such that said first and second securing arms are diagonally opposite one another.

18. An electrical box as claimed in claim 17, wherein each of said side walls, end walls and rear wall are formed of plastic.

19. An electrical box for mounting within a rectangular opening of a mounting surface, comprising:

first and second side walls, each of said side walls laving a first end and a second end spaced apart from one another;

a first end wall extending substantially perpendicularly between one of said ends of each of said side walls and having a first front edge, a first flat outer surface having first and second coplanar and spaced apart contact surfaces extending outwardly therefrom and rearwardly from said first front edge and arranged substantially parallel to said first end wall for engaging the opening of the mounting surface upon mounting the box within the opening, and a first mounting flange for engaging the exterior surface of the mounting surface upon inserting the box into the opening extending outwardly from said first end wall a greater distance than said first and second contact surfaces, said first and second contact surfaces being spaced apart with at least 50% of the distance between said side walls between said first and second contact surfaces and extending rearwardly a distance less than 50% of the length of said side walls;

a second end wall extending between the other of said ends of said side walls and having a second front edge and a second flange extending outwardly from said second end wall for engaging an exterior surface of the mounting surface upon inserting the box into the opening;

a rear wall extending between said side walls and said end walls;

first securing means for securing the box within the opening, said first securing means extending outwardly from and being movably mounted to said first outer surface of said first end wall between a first retracted position in which said first securing means extends outwardly from said first end wall a distance no greater than the distance said first and second contacting points extend outwardly from said first end wall and a second extended position in which said first securing means engages an interior surface of the mounting surface upon inserting the box into the opening and extends outwardly a distance greater than the distance said first and second contacting points extend outwardly from said first end wall; and second securing means for securing the box within the opening mounted to and extending outwardly from said second end wall and engaging the interior surface of the mounting surface upon inserting the box into the opening, said first ends of said first and second side walls and said first and second edges of said first and second end walls forming a rectangular opening.

20. An electrical box as claimed in claim 19, wherein said second end wall extends substantially perpendicular to each of said side walls and has a second flat outer surface having third and fourth coplanar and spaced apart contact surfaces extending outwardly therefrom and rearwardly from said second front edge and arranged substantially parallel to said second end wall for engaging the opening of the mounting surface upon mounting the box within the opening and said second flange extends outwardly from said second end wall a greater distance than said third and fourth contact surfaces, said third and fourth contact surfaces being spaced apart with at least 50% of the distance between said side walls between said third and fourth contacting surfaces and extend rearwardly by a distance less than 50% of the length of said second end wall.

21. An electrical box as claimed in claim 20, wherein said second securing means extends outwardly from and is movably mounted to said second end wall and has a first retracted position in which said second securing means extends outwardly a distance no greater than the distance said third and fourth contacting points extend outwardly from said second end wall and a second extended position in which said second securing means extends outwardly a greater distance than said third and fourth contacting points for engaging the interior surface of the mounting surface upon inserting the box into the opening.

22. An electrical box for mounting within a rectangular opening of a mounting surface, comprising:

a rear wall;

a first side wall and a second side wall being coupled to said rear wall, said first and second side walls extending substantially parallel to each other and substantially perpendicular to said rear wall;

a first end wall and a second end wall being coupled substantially perpendicularly to said rear wall and said first and second side walls to form an enclosure with an open front, each of said first and second end walls having an exterior surface and an interior surface with a flat wall portion extending perpendicularly between said first and second side walls adjacent said open front so that said open front forms a rectangular passageway;

a first securing member movably coupled to said first end wall adjacent said first side wall between a retracted position and an extended position, said first end wall having a first contacting surface spaced outwardly from said exterior surface of said first end wall for engaging a portion of the rectangular opening of the mounting surface;

a first positioning member fixedly coupled to said first end wall adjacent said second side wall, and having a second contacting surface spaced outwardly from said exterior surface of said first end wall for engaging a portion of the rectangular opening of the mounting surface, said second contacting surface being coplanar with said first contacting surface to form a first plane extending substantially parallel to said flat wall portion of said end wall adjacent said open front, said first securing member lying inwardly from said first plane when in its retracted position;

a second securing member movably coupled to said second end wall adjacent said second side wall between a retracted position and an extended position, said second end wall having a third contacting surface spaced outwardly from said exterior surface of said second end wall for engaging a portion of the rectangular opening of the mounting surface; and a second positioning member fixedly coupled to said second end wall adjacent said first side wall, and having a fourth contacting surface spaced outwardly from said exterior surface of said second end wall for engaging a portion of the rectangular opening of the mounting surface, said fourth contacting surface being coplanar with said third contacting surface to form a second plane extending substantially parallel to said flat wall portion of said second end wall adjacent said open front, said second securing member lying inwardly from said second plane when in its retracted position.

* * * * *